(12) United States Patent
Montgomery et al.

(10) Patent No.: US 11,966,949 B2
(45) Date of Patent: Apr. 23, 2024

(54) SYSTEMS AND METHODS FOR TARGETING BID AND POSITION FOR A KEYWORD

(71) Applicant: Capital One Services, LLC, McLean, VA (US)

(72) Inventors: James O. H. Montgomery, McLean, VA (US); Athanassios Kintsakis, Mountain View, CA (US); Keegan Hines, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/316,784

(22) Filed: May 12, 2023

(65) Prior Publication Data
US 2023/0281665 A1 Sep. 7, 2023

Related U.S. Application Data

(63) Continuation of application No. 17/656,733, filed on Mar. 28, 2022, now Pat. No. 11,687,969, which is a
(Continued)

(51) Int. Cl.
*G06Q 30/0251* (2023.01)
*G06Q 30/0241* (2023.01)
(Continued)

(52) U.S. Cl.
CPC ..... *G06Q 30/0256* (2013.01); *G06Q 30/0244* (2013.01); *G06Q 30/0275* (2013.01); *G06Q 30/0277* (2013.01)

(58) Field of Classification Search
CPC .......... G06Q 30/0256; G06Q 30/0244; G06Q 30/0275; G06Q 30/0277
See application file for complete search history.

(56) References Cited

U.S. PATENT DOCUMENTS 9,456,086 B1 9/2016 Wu et al.
2009/0094073 A1 4/2009 Cheung et al.
(Continued)

OTHER PUBLICATIONS

Ikonomovska, Elena; "Real-Time Bid Prediction using Thompson Sampling-Based Expert Selection" (Year: 2015).*
(Continued)

*Primary Examiner* — Sam Refai
*Assistant Examiner* — Kyle G Robinson
(74) *Attorney, Agent, or Firm* — Bookoff McAndrews, PLLC

(57) ABSTRACT

Disclosed are methods, systems, and non-transitory computer-readable medium for targeting bid and position for a keyword. For instance, the method may include obtaining information about the keyword, the information about the keyword including observations of value with respect to position for the keyword. The method may further include applying a Gaussian Process Model on the observations to obtain a prediction function and associated uncertainties, the prediction function and the associated uncertainties relating positions to expected values; applying a Thompson sampling reinforcement learning model on the expected values and the positions to obtain a target position; and applying a bid model to the target position to obtain bid information for the keyword. The method may also include transmitting a bid message to a search engine, the bid message including the bid information.

20 Claims, 8 Drawing Sheets

Related U.S. Application Data continuation of application No. 17/187,389, filed on Feb. 26, 2021, now Pat. No. 11,288,704, which is a continuation of application No. 16/460,653, filed on Jul. 2, 2019, now Pat. No. 10,937,058.

(51) Int. Cl.
 *G06Q 30/0242* (2023.01)
 *G06Q 30/0273* (2023.01)

(56) References Cited

U.S. PATENT DOCUMENTS

| | | |
|---|---|---|
| 2009/0327083 A1 | 12/2009 | Mathew et al. |
| 2010/0004974 A1 | 1/2010 | Libby et al. |
| 2010/0250335 A1 | 9/2010 | Cetin et al. |
| 2012/0130804 A1 | 5/2012 | Guo et al. |
| 2013/0215116 A1 | 8/2013 | Siddique et al. |
| 2015/0066639 A1 | 3/2015 | Knapp et al. |

OTHER PUBLICATIONS

Rassmussen et al., "Gaussian Processes for Machine Learning" (2006) (266 pages).

Brochu et al., "A Tutorial on Bayesian Optimization of Expensive Cost Functions, with Application to Active User Modeling and Hierarchical Reinforcement Learning" (Dec. 14, 2010) (49 pages).

"Thompson Sampling." Wikipedia, Wikimedia Foundation, Jan. 14, 2021, en.wikipedia.org/wiki/Thompson_sampling#Bayesian_control_rule.

Ikonomovska, Elena; Real-Time Bid Prediction using Thompson Sampling-Based Expert Selection; Aug. 2015; https://doi.org/10.1145/2783258.2788586 (Year: 2015).

\* cited by examiner

SYSTEMS AND METHODS FOR TARGETING BID AND POSITION FOR A KEYWORD

CROSS-REFERENCE TO RELATED APPLICATION(S)

This patent application is a continuation of and claims the benefit of priority to U.S. Nonprovisional patent application Ser. No. 17/656,733, filed Mar. 28, 2022, which is a continuation of U.S. Nonprovisional patent application Ser. No. 17/187,389, filed Feb. 26, 2021, now U.S. Pat. No. 11,288, 704, which is a continuation of U.S. Nonprovisional patent application Ser. No. 16/460,653, filed on Jul. 2, 2019, now U.S. Pat. No. 10,937,058, the entireties of each of which being incorporated herein by reference.

TECHNICAL FIELD

Various embodiments of the present disclosure relate generally to systems and methods for targeting bid and position for a keyword and, more particularly, to systems and methods for targeting bid and position for a keyword using a Gaussian process model.

BACKGROUND

Generally, users may submit search queries to search engines, such as "apply for credit card." The search engine may determine a quality score of a keyword with respect to the search query via a model the search engine provider uses that takes into account ad copy associated with the keyword, load time of a webpage associated with the keyword, etc. The search query and the keyword may each be one or more words or phrases, and the search query and the keyword may match identically, or the keyword may match only a few terms (e.g., a portion) of the search query. Entities, such as businesses, may submit bids to search engines for specific keywords to have a webpage or link be displayed to the user that searches for the keyword or a similar keyword. The search engine may convert an entity bid into a bid score (such as, for example, Ad Rank) by calculating the bid score based on the bid of the entity and the quality score. The search engine may display entity webpages, ad copy, and/or links in accordance with corresponding bid scores, such as in a list organized by decreasing bid score (e.g., webpages/ links associated with higher bid scores may be arranged at the top of the list while webpages/links associated with lower bid scores may be arranged at the bottom of the list). Additionally, following the list being organized by bid score, the search engine may display natural results to the user.

However, most approaches to search engine optimization are flawed. First, an approach to search engine optimization may make very simple assumptions about an auction space (e.g., that the relationship between model features and rewards is linear), and therefore may omit considerations of non-linearity. Second, an approach to search engine optimization may try to maximize click rate or impressions on keywords and, therefore may not consider profit generated as compared to the cost of a bid. Third, an approach to search engine optimization may not use reinforcement learning, and therefore, may adapt slowly to changes in the auction space. For instance, there may be various seasonal effects and, since the auction space is an adversarial environment, other entities may adjust their bidding behavior.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for targeting bid and position for a keyword.

For example, a method may include obtaining information about the keyword; applying a Gaussian Process Model on the information about the keyword to obtain a target position; applying a bid model to the target position to obtain bid information for the keyword; and transmitting a bid message to a search engine, the bid message including the bid information.

A system may include memory storing instructions; and a processor executing the instructions to perform a process. The process may include: obtaining information about the keyword, the information about the keyword including observations of value with respect to position for the keyword; applying a Gaussian Process Model on the observations to obtain a target position; applying a bid model to the target position to obtain bid information for the keyword; and transmitting a bid message to a search engine, the bid message including the bid information.

A method may include obtaining information about the keyword, the information about the keyword including observations of value with respect to position for the keyword; applying a Gaussian Process Model on the observations to obtain a prediction function and associated uncertainties, the prediction function and the associated uncertainties relating positions to expected values; applying a Thompson sampling reinforcement learning model on the expected values and the positions to obtain a target position; applying a bid model to the target position to obtain bid information for the keyword; and transmitting a bid message to a search engine, the bid message including the bid information.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
FIG. 1 depicts an exemplary search result page for targeting bid and position for a keyword, according to one or more embodiments.

Various embodiments of the present disclosure relate generally to targeting bid and position for a keyword.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to systems and methods for targeting bid and position for a keyword using a Gaussian process model. As discussed in more detail below, a system of the present disclosure may form observations of, e.g., profit versus position for a keyword. The system may then apply a Gaussian process model on the observations, which may make non-linear predictions (e.g., a non-linear prediction function) with uncertainty estimates along continuous or discrete input and output spaces, while also being responsive to changes over time. The system may apply a selection algorithm to the prediction function/uncertainty estimates to make a selection of a position to aim for in a search page result order (e.g., a target position). For example, the selection algorithm may be a reinforcement learning model or algorithm (e.g., Thompson sampling). The reinforcement learning model may select a target position in different regions of the prediction function/uncertainty estimates so as to sample a reward function at different values. Therefore, the reinforcement learning model may learn more about an auction space, while exploiting known profitable regions, as well as adapting to changing auction environments. The system may then obtain bid information for a selected target position based on applying a backward filtering model on historic bid-to-position data. The system may also apply a discounting factor to weight training observations proportional to their age relative to prediction time to account for changing auction environments.

FIG. 1 depicts an exemplary search result page for targeting bid and position for a keyword, according to one or more embodiments. A search result page 100 of a search engine may be generated in response to a search term 105 input by a user. The search result page 100 may display one or more natural results 115 and/or one or more keyword results 110. The one or more keyword results 110 may be arranged in a sorted list 120 which has been ranked based on various criteria, such as in accordance with an bid score ranking algorithm. The list may be sorted based on bid amounts, such that in some examples, a higher placement in the sorted list 120 (e.g., a placement closer to a top or first place in the sorted list 120) may require a higher bid amount. That is, in some arrangements, rewards are linear, e.g., such that a higher placement may create a larger reward.

Figure 2A:
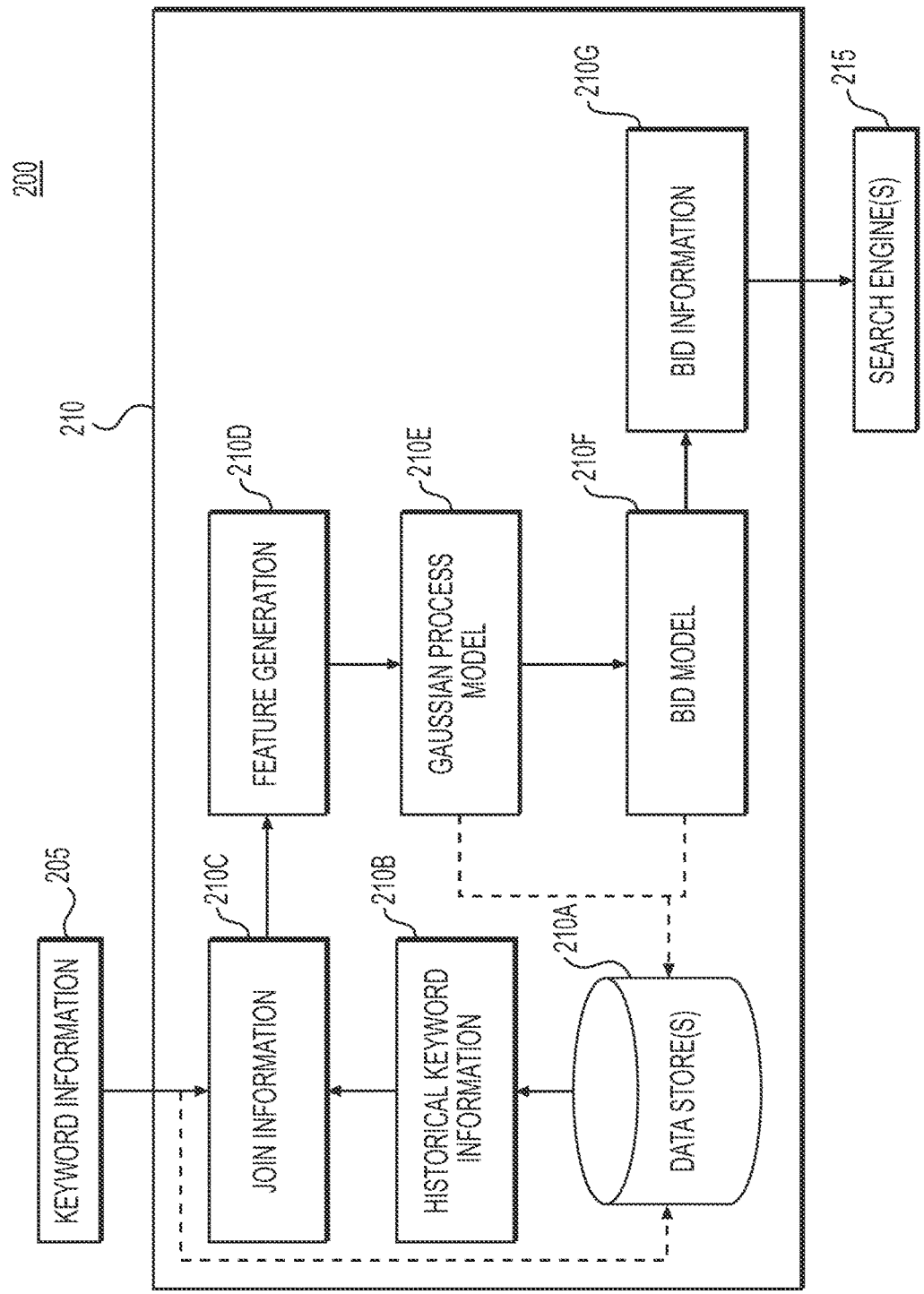
FIG. 2A depicts an exemplary block diagram of a system for targeting bid and position for a keyword according to one or more embodiments.

FIG. 2A depicts an exemplary block diagram of a system 200 for targeting bid and position (e.g., a position within sorted list 120) for a keyword according to one or more embodiments. The system 200 may be owned by, or operated on behalf of, a hosting entity (e.g., a business or non-profit entity). The system 200 may include a computing device 210 for executing a keyword operation. The computing device 210 may be comprised of, or include, one or more processors (not shown) for executing the keyword operation. The keyword operation may target one or more bid(s) and one or more positions(s) for one or more keyword(s). The hosting entity may determine specific word(s) or phrase(s) as the one or more keyword(s), and input the one or more keyword(s) into the system 200. Additionally, as shown in FIG. 2A, the computing device 210 may include one or more data store(s) 210A (which may store, among other information, historical keyword information 210B), a join information section 210C, a feature generation section 210D, a Gaussian process model section 210E, and/or a bid model section 210F. Additionally, system 200 may include a network interface for transmitting and receiving network messages from/to third parties and/or search engine(s). Optionally, the system 200 may be hosted in a cloud environment.

The computing device 210 may execute the keyword operation to determine a target position (e.g., a target position within sorted list 120) and a bid for a keyword (e.g., searches for "credit card" may have a different bid landscape than for "pet"). The computing device 210 may execute the keyword operation to determine the target position and bid for the keyword, with or without separate determinations for target positions and bids for the keyword with respect to a target search engine (e.g., searches conducted on one search engine, such as Google, may have a different bid landscape than searches conducted on a second search engine, such as Yahoo) or a target search device (e.g., searches conducted on a mobile device may have a different bid landscape than searches conducted in browsers on desktop computers).

The computing device 210 may receive keyword information 205 via the network interface. The computing device 210 may receive the keyword information 205 from a third party or from a search engine(s). For instance, the computing device 210 may transmit (via the network interface) a request to an application programming interface (API) hosted by a third party/search engine and may receive a response including the keyword information 205. That is, the processor may, according to a script program or user inputs, interact with webpages of the third party/search engine, and may receive a response including the keyword information 205. The computing device 210 may receive a transmission from the third party/search engine including the keyword information 205 at regular intervals of time (e.g., each night, at a specified chronological time each day, etc.).

The keyword information 205 may include information about at least one of a number of clicks, a number of impressions, or an average position for the one or more keyword(s). The keyword information 205 may be for a most recent period of time (e.g., a number of clicks during the last 24 hours, the number of impressions during the last 24 hours, and/or the average position for the one or more keyword(s) during the last 24 hours). The keyword information 205 may be stored in the one or more data store(s) 210A in association with/as a part of the historical keyword information 210B. As used herein, a click may be a selection of a link associated with a keyword. Additionally, as used herein, an impression may be a view of a webpage that includes a link associated with a keyword, and an average position may be an average position of a link for a keyword for the hosting entity within sorted list 120. For example, if there are three impressions on a first day and the ad/link was in positions 1, 4, 2 for each of those impressions, then the average position may be 2.33.

The computing device 210 may retrieve the historical keyword information 210B from the one or more data store(s) 210A. For example, the computing device 210 may retrieve the historical keyword information 210B in response to receiving the keyword information 205.

The historical keyword information 210B may include information about at least one of a number of applications, a number of accounts, a number of conversions, or values associated with the one or more keyword(s). An application may be a request for a membership or product by a user/customer of the hosting entity. An account may be a membership or product purchased by a user/customer of the hosting entity. A conversion may be a change between membership levels or products by a user/customer of the hosting entity. A value may be a present value or net present value of an account or conversion. The value may be determined on a per day basis. The value may be a reward used in the reinforcement learning model of the present disclosure, as discussed in detail below.

The historical keyword information 210B may associate an application, an account, a conversion, or a value to a keyword based on a user/customer clicking a specific webpage or link that was displayed, at a specific position of sorted list 120, at a specific time and/or geographic location, for the keyword. The historical keyword information 2106 may associate the application, the account, the conversion, or the value with the specific position of the sorted list 120. The historical keyword information 2108 may associate the application, the account, the conversion, or the value with a time and/or geographic location. The historical keyword information 210B may also include customer type information for each application, the account, the conversion, or the value.

The geographic location may be coordinates or a general location/region such as a county, a state, a country, etc. The geographic location may be determined based on an IP address of the user. The time may be a date or time stamp indicative of when the webpage or link was displayed, or a date or time stamp based on when an application was submitted, when an account was started/recently used, when a conversion occurred, etc. For instance, the webpage or link may be displayed on a search result page of a search engine for the keyword (such as the search result page 100, discussed above); a user/customer may select that webpage or link; and the hosting entity may determine the user/customer selected that webpage or link associated with the keyword from the search result page 100. Alternatively or additionally, the hosting entity may determine that the webpage or link is associated with the keyword based on cookies or other user device tracking techniques to relate the user/customer with the keyword, when the user/customer submitted an application or performed a conversion.

The computing device 210 may, via the join information section 210C, join the historical keyword information 2108 and the keyword information 205 to obtain current keyword dataset(s) for the one or more keyword(s). The computing device 210 may generate the one or more current keyword dataset(s) for the one or more keyword(s) by performing an intersection algorithm for each of the one or more keyword(s). Specifically, the intersection algorithm may determine all instances where the historical keyword information 210B and the keyword information 205 are associated with a same keyword (e.g., an intersection of the two sets of data for data elements that are associated with a same keyword). For instance, if the historical keyword information 210B and the keyword information 205 are stored/structured in a relational databases format, the processor may perform a join operation for a keyword to obtain the current keyword dataset for that keyword.

The computing device 210 may, in the feature generation section 210D, process the one or more current keyword dataset(s) to obtain one or more feature set(s). Each feature set may include observations for a keyword of the one or more keyword(s). Each observation may include a position-value pair (e.g., [position, value]). The position-value pair may include a position and a value.

The position-value pairs for the observations may be generated based on the current keyword dataset for a keyword. For instance, for each application, account, conversion, or value of the current keyword dataset, the computing device 210 may determine, as values for the position-value pairs of the observations, a profit-per-impression; and determine, as positions for the position-value pairs of the observations, the positions that were associated with the application, account, conversion, or value of the current keyword dataset.

Furthermore, the computing device 210 may associate with each position-value pair a time (e.g., date or time stamp), based on the time associated with the application, account, conversion, or value of the current keyword dataset (e.g., the position-value pair may be a position-value-time set, [position, value, time]).

In one example, the computing device 210 may determine the profit-per-impression for each observation by performing a profit-by-impression algorithm. The profit-by-impression algorithm may determine a present value of an application, an account, a conversion, or value; subtract a cost for the application, account, conversion, or value from the present value to obtain an adjusted present value; and divide the adjusted present value by the number of impressions for the keyword. The present value may be determined based on revenue received in relation to the application, account, conversion, or value. Additionally or alternatively, the value may be the output of a model based on historic data collected from existing customers. The cost may be determined based on a bid amount for the displayed webpage or link and/or a cost to process and/or maintain the application, account, conversion, or value.

Additionally or alternatively, as daily profit may vary substantially, the computing device 210 may determine the profit-per-impression for each observation by performing a moving average algorithm. The moving average algorithm may determine a profit for each observation; and divide the profit by the number of impressions for the keyword. The profit may be determined by a moving average of present value for an observation, with respect to a predetermined number of previous observations or a number of observations for a predetermined time period before the current observation. The predetermined number of previous observations utilized by the moving average may be determined by a smoothing filter to minimize variance in profit estimates over time. For instance, the moving average of the present value may be determined in accordance with a simple moving average algorithm, a cumulative moving average algorithm, a weighted moving average algorithm, and/or an exponential moving average algorithm. Furthermore, the profit may be determined based on a difference between revenue and cost for an observation, divided by a number of clicks associated with a displayed webpage or link.

In another aspect of the disclosure, the values of the position-value pairs and/or position-value-time sets may be a click volume, an impression volume, or a profit volume. Click volume may be a number of clicks for a webpage or link that is displayed for one period of time (e.g., one day). Impression volume may be a number of impressions for a webpage or link that is displayed for one period of time (e.g., one day). Profit volume may be a total of adjusted present value discussed above for a webpage or link that is displayed for one period of time (e.g., one day).

Furthermore, the computing device 210 may filter the observations to include specific periods of time, based on a time associated with a value-position-time set. For instance, the processor may filter all observations to include observations only for a previous four months and/or to exclude or include specific seasonal data.

The computing device 210 may, for each feature set for each of the one or more keyword(s), process the feature set through the Gaussian process model section 210E and the bid model section 210F. The processor may perform this in series (e.g., one after the other) or in parallel using multiple instances of the keyword operation.

The computing device 210 may, in the Gaussian process model section 210E of the keyword operation, process information about one or more keyword(s) to obtain one or more target position(s) for each of the one or more keyword(s). Specifically, the Gaussian process model section 210E may include two stages: a first stage and a second stage. The first stage may apply a Gaussian process model to observations in a feature set for a keyword to obtain a prediction function and associated uncertainties. The second stage may apply a selection algorithm to the prediction function and associated uncertainties to obtain the target position.

In the first stage, the Gaussian process model may take the feature set and one or more prior function(s), and, using Bayesian inference, make a posterior inference to a prediction function with associated uncertainties. The prior function(s) may be initiated as one or more of linear functions, quadratic functions, or exponential functions relating to kernels, including but not limited to: constant, squared exponential, matern, periodic, and linear. After the Gaussian process model has been performed a first time, the outputted prediction function for the keyword may be stored in the one or more data store(s) 210A as a prior function. In subsequent processes of the Gaussian process model, the Gaussian process model may retrieve the stored prediction function as a prior function.

The Gaussian process model may take as input one or more matrices of training features and one or more matrices of test features and then output a mean and covariance matrix. The mean matrix may describe the values of a mean function of the posterior corresponding to the input test features. The covariance matrix may describe the uncertainty of each input test feature relating to every other test feature. Sampling from the mean and covariance matrix may be equivalent to sampling a function directly from the posterior of the Gaussian process model.

The prediction function and the associated uncertainties may relate positions to expected profit values. The associated uncertainties may be for various levels of credible intervals, e.g., a 50% credible interval, a 75% credible interval, and a 95% credible interval. However, the associated uncertainties may include different credible intervals or more or less credible intervals, such only a 50% credible interval, a 50% credible interval and a 80% credible interval, etc.

In the second stage, the selection algorithm may receive the outputs of the Gaussian process model (e.g., the prediction function and the associated uncertainties) as an input. In one aspect of the disclosure, the selection algorithm may select values from the mean and covariance matrices output by the Gaussian process according to a sampling algorithm equivalent to sampling a function from the posterior; select a maximum value from the among the sampled values (e.g., by comparing or sorting the selected values); determine a position corresponding to the maximum value using the sampled function (e.g., by finding an inverse prediction function for the prediction function or by numerical approximation); and set the sampled position as the target position. This sampling methodology is equivalent to Thompson Sampling. Alternative sampling methodologies may be used in place of Thompson sampling, such as maximum probability of improvement (MPI), expected improvement (EI) and upper confidence bound (UCB).

In another aspect of the disclosure, the selection algorithm may be a machine learning model, such as an analytical model, a neural network, a reinforcement learning model, or, generally, a model that takes inputs (e.g., a feature set) and outputs a target (e.g., a target position) based on a trained function. The function may be trained using a training set of labeled data, while deployed in an environment (simulated or real), or while deployed in parallel to a different model to observe how the function would have performed if it was deployed. Specifically, in this aspect of the disclosure, the selection algorithm may be a Thompson sampling reinforcement learning model.

The Thompson sampling reinforcement learning model may include an agent that takes one of one or more action(s) (e.g., from an action function) in an environment to maximize an expected reward (based on a reward function) based on the modeled state of the environment (which represents the environment and the agent in that environment, as updated based on the agent's action and other changes in the environment). The agent then may receive the actual reward and the new state in response to the chosen action, and makes another action. Generally, the agent selects actions according to a policy. The policy may be updated according to the history of actions, states, and rewards.

The Thompson sampling reinforcement model may choose an exploit action (the action corresponding to the maximum value of the Gaussian process mean matrix output) or an explore action (any action that is not an exploit action) according to an exploit-explore ratio of the policy. Furthermore, the Thompson sampling reinforcement learning model may avoid selecting the target position from a no-bid range of positions, according to the policy.

The no-bid range of positions, as separated from the exploit range and the explore range, may be determined based on positions corresponding to expected values below a threshold value. For instance, the Thompson sampling reinforcement learning model may determine a first range of positions, as approaching from zero (e.g., from negative infinity on an axis), that have a value below zero (as the threshold), as the no-bid range of positions. A position at which expected values exceeds the threshold, as approaching from zero, may be a cutoff between the no-bid range of positions and the exploit range and the explore range of positions. Furthermore, the Thompson sampling reinforcement learning model may determine that positions greater than the position at which expected values exceeds the threshold, may correspond to the exploit range and the explore range. The relative sizes (e.g., a magnitude of the range) of the exploit range and the explore range may be determined based on the expected values and the positions for the keyword. For instance, the exploit range may be determined as any range that has expected values above the threshold, and the explore range may be determined as any range (other than the no-bid range) that has an expected value below the threshold. The no-bid range may be set or modified manually by the model user.

The selection of the target position may be determined by the exploit-explore ratio, where the exploit-explore ratio determines how often a position is selected from the exploit range and how often a position is selected from the explore range. For instance, the exploit-explore ratio may be four (4) exploit selections to one (1) explore selection in a cycle, or the exploit-explore ratio may select exploit or explore randomly with weighted odds towards exploit (e.g., more likely to select exploit over explore, but the selection remains random). The random selection may be generated by, e.g., a random number generator. The explore-exploit ratio may be explicitly set or may be determined implicitly by the Thompson sampling reinforcement model.

After a target position for a keyword is selected, a bid may be obtained for the keyword (as discussed below), the bid may be transmitted to a search engine (as discussed below), a result of the bid for the keyword may be received (in response to a user entering a search term in the search engine), and the model may update the reward function. The action (bid) may result in a different state (ad position) than predicted by the model. The model will then update the model's estimate of the function relating bid to position (e.g., the model may submit a bid targeting a position of two (2) and actually observe an ad position of three (3), then the bid to position model will update to reflect the new data).

The computing device 210 may, in the bid model section 210F, process the one or more target position(s) to obtain bid information 210G. Specifically, the bid model section 210F may include two stages: a first stage and a second stage. The first stage may apply a backwards filtering model to historical bid position data. The second stage may perform a bid selection process to obtain bid information 210G based on the output of the backwards filtering model and a target position.

In the first stage of the bid model 210F, the computing device 210 may obtain historical bid position data from the one or more data store(s) 210A. The historical bid position data may be value-position-time sets (e.g., [value, position, time] for each data point of the historical bid position data). The values may be score values or bid amounts for previously placed webpages or links for a keyword. The positions may be positions for the previously placed webpages or links. The times may be a date or time stamp for when the previously placed webpages or links were displayed. The historical bid position data may be collected from a third party/search engine(s), collected by the hosting entity, or a combination thereof.

The processor may apply a backwards filtering model to filter the historical bid position data to form a bid-to-position function. Specifically, the backwards filtering model may start with the most recent bid-position-time set (using the time of a bid-position-time set) and progress backwards in time (using the time of the bid-position-time set), to form a monotonically decreasing function on the values and positions of bid-position-time sets of the historical bid position data.

For instance, the backwards filtering model may, for each next bid-position-time set backwards (e.g., previous) in time, use a valid-or-not algorithm to determine whether the bid-position-time set is valid or invalid. A valid bid-position-time set may be kept or remain. An invalid bid-position-time set may be filtered out of or removed from a result set. For example, if a bid of $1.00 resulted in a position of 2 yesterday and a bid of $1.10 resulted in position 3 today, then the bid-position data from yesterday may be considered invalid to preserve the monotonically decreasing trend desired in the post-filtered data. Removed bid-position-time sets may be considered no longer valid for a current bid landscape. The valid-or-not algorithm may determine whether a bid-position-time set is valid or invalid by determining whether a bid-position of the bid-position-time set is within a threshold distance of a monotonically decreasing function. The monotonically decreasing function may be retrieved from the one or more data store(s) 210A. The retrieved monotonically decreasing function may reflect the most recent bid landscape (e.g., higher bids for lower positions), as determined by backwards filtering model the last time the backwards filtering model was performed for the keyword. The monotonically decreasing function may be updated by the backwards filtering model based on new data to shift or transform the monotonically decreasing function, during the backwards filtering model process and/or periodically (e.g., before a batch process). The updated monotonically decreasing function may be stored in the one or more data store(s) 210A, in place of, or in addition to, the retrieved monotonically decreasing function.

The bid-to-position function may take as inputs the result set discussed above. The result set may include discrete values formed from remaining values of the historical bid position data after the applying the backwards filtering model.

In the second stage of the bid model 210F, to select a bid for a target position, the bid selection process may use the discrete values of the result set to estimate a bid for the target position. For instance, the bid selection process may perform interpolation on the result set using piecewise constant interpolation, linear interpolation, polynomial interpolation, or spline interpolation to obtain a bid for the target position.

In one aspect of the disclosure, to estimate the bid for the target position, the bid selection process may use linear interpolation to interpolate to the target position using preceding and following discrete values and their corresponding positions to obtain the bid. For instance, the bid selection process may find two bid-position-time sets of the result set that have a position more than the target position (first position with corresponding value, first value) and a position less than the target position (second position with corresponding value, second value), and interpolate a bid based on a difference between the first value and second value and a difference between the first position and the second position. The bid selection process may select the closest bid-position-time sets to the target position.

In the case there is not a following or preceding discrete value, the bid selection process may use a predefined adjustment per position to obtain the bid based on the following or preceding discrete value that is present. For instance, the predefined adjustment per position may be a +/−15% bid adjustment to move up/down per position.

The bid, the target position, and the keyword may be stored in the one or more data store(s) 210A. The bid and the keyword may be collectively referred to herein as "bid information" 210G.

The computing device 210 may transmit the bid information 210G to one or more search engine(s) using the network interface in a bid message. Additionally or alternatively, the computing device 210 may collect bid information 210G for each search engine, for each keyword/device combination, and then transmit a bid message with collective bid information 210G to each search engine.

Due to a dynamic environment in which the keyword operation operates, it may be particularly challenging to train the keyword operation offline. For instance, it may be difficult to accurately simulate bidding in an auction process and along with behavior of participating players. For this reason, the keyword operation may be evaluated in parallel to an existing model to generate feedback. For instance, the keyword operation may be run for a keyword, and a suggested target position/bid may be evaluated against other bids/positions that were actually submitted. Additionally or alternatively, for a sample size of keywords, the keyword operation may be run, and bids may be submitted to search engine(s), while also using an existing model to submit bids for a majority of bids, so that a feedback to the keyword operation may be based on actual interaction with an auction process.

The keyword operation was evaluated against an existing model. The evaluation indicates that the keyword operation provided an increase in profit greater than or equal to 15% over a four (4) month evaluation period for a sample of high click volume keywords.

The system 200 of the present disclosure may consider non-linearity of a position to profit relationship, by using a Gaussian process model 210E; therefore, avoiding oversimplification about an auction space (e.g., that reward to position relationships are linear). Furthermore, the system 200 of the present disclosure may consider profit instead of only click rate or impression rate. Moreover, the system 200 of the present disclosure may use reinforcement learning to adapt to changes, e.g., caused by seasonal effects or changes in other entities bidding behavior.

Figures 2B, 2C:
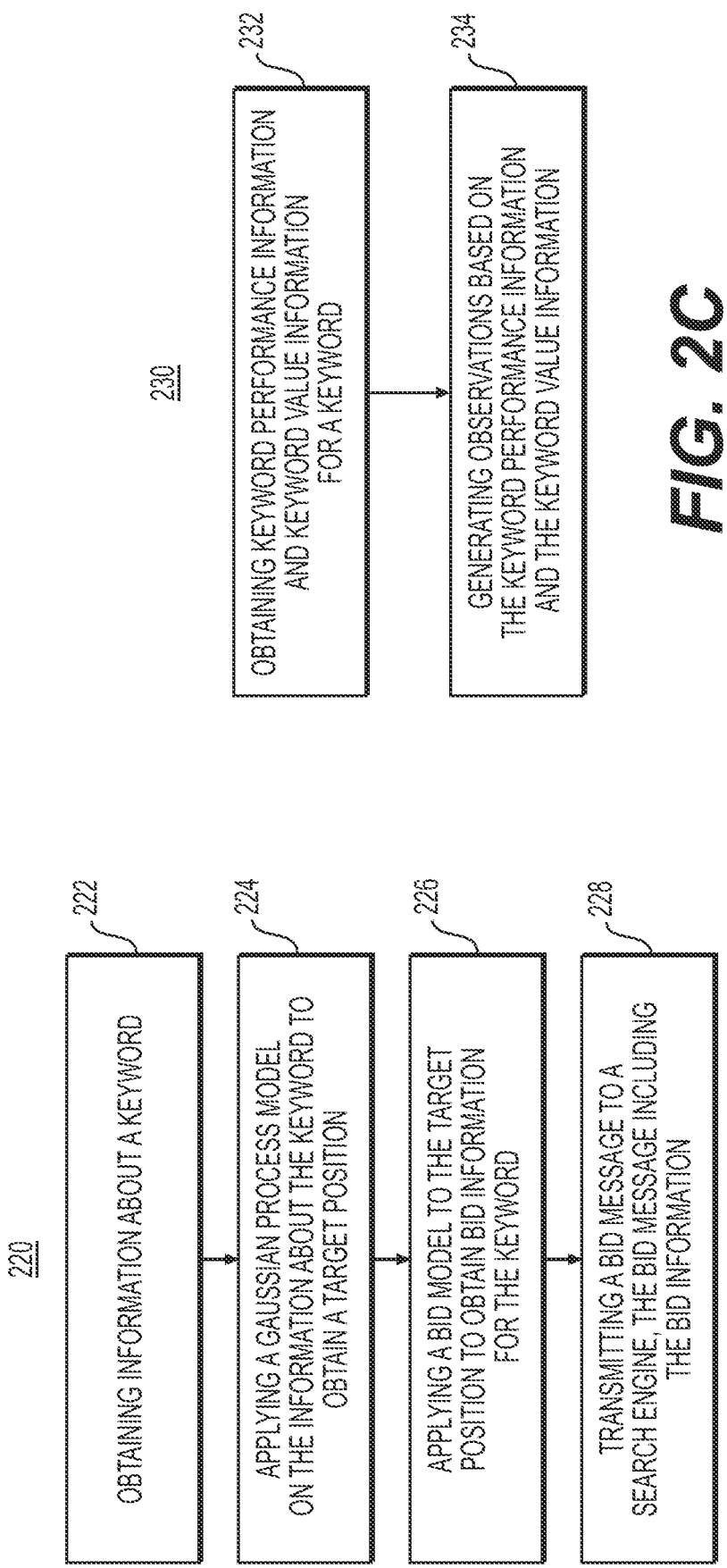
FIGS. 2B-2E depict flowcharts for targeting bid and position for a keyword, according to one or more embodiments.

FIGS. 2B-2E depict flowcharts for targeting bid and position for a keyword, according to one or more embodiments. FIG. 2B may depict a flowchart of a process 220, included in the keyword operation, to obtain and transmit bid information. The process 220 may be performed by the computing device 210, discussed above, by executing the keyword operation. The computing device 210 may start the process 220 by obtaining information about a keyword (block 222). The computing device 210 may then apply a Gaussian process model (e.g., Gaussian process model 210E) on the information about the keyword to obtain a target position (block 224). The computing device 210 may then apply a bid model (e.g., bid model 210F) to the target position to obtain bid information for the keyword (block 226). The computing device 210 may then transmit a bid message to a search engine (block 228). The bid message may include the bid information.

FIG. 2C may depict a flowchart of a process 230, included in the keyword operation, to obtain information about a keyword, as discussed in block 222 of FIG. 2B. The computing device 210 may start the process 230 by obtaining keyword performance information and keyword value information for a keyword (block 232). The computing device 210 may then generate observations based on the keyword performance information and the keyword value information (block 234). The keyword performance information may correspond to the keyword information discussed above with respect to FIG. 2A. The keyword value information may correspond to the historical keyword information discussed above with respect to FIG. 2A.

Figures 2D, 2E:
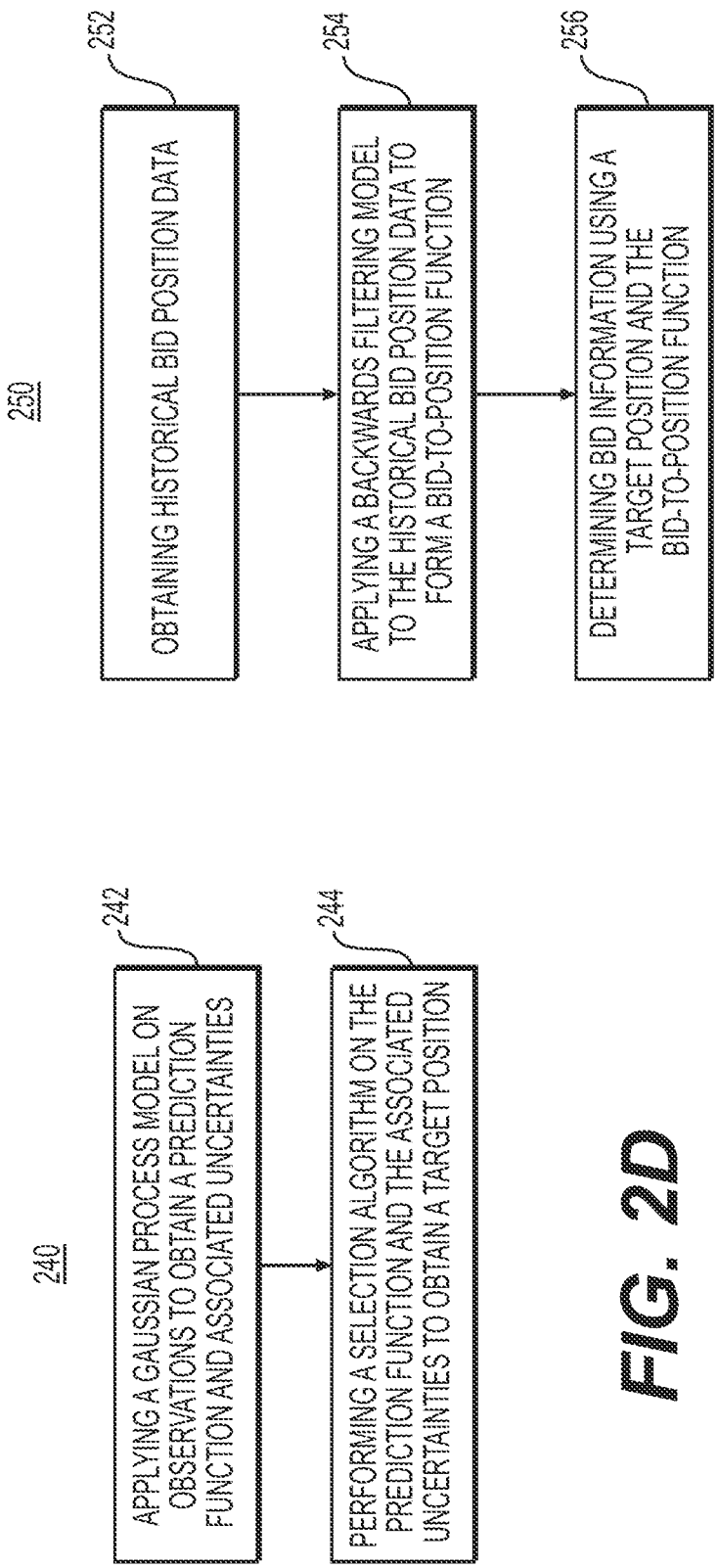

FIG. 2D may depict a flowchart of a process 240, included in the keyword operation, to obtain a target position, as discussed in block 224 of FIG. 2B. The computing device 210 may start the process 240 by applying a Gaussian process model (e.g., Gaussian process model 210E) on observations to obtain a prediction function and associated uncertainties (block 242). The computing device 210 may then perform a selection algorithm on the prediction function and associated uncertainties to obtain a target position (block 244).

FIG. 2E may depict a flowchart of a process 250, included in the keyword operation, to obtain bid information, as discussed in block 226 of FIG. 2B. The computing device 210 may start the process 250 by obtaining historical bid position data (block 252). The computing device 210 may then apply a backwards filtering model to the historical bid position data to form a bid-to-position function (block 254). The computing device 210 may then determine bid information using a target position and the bid-to-position function (block 256).

Figure 3A:
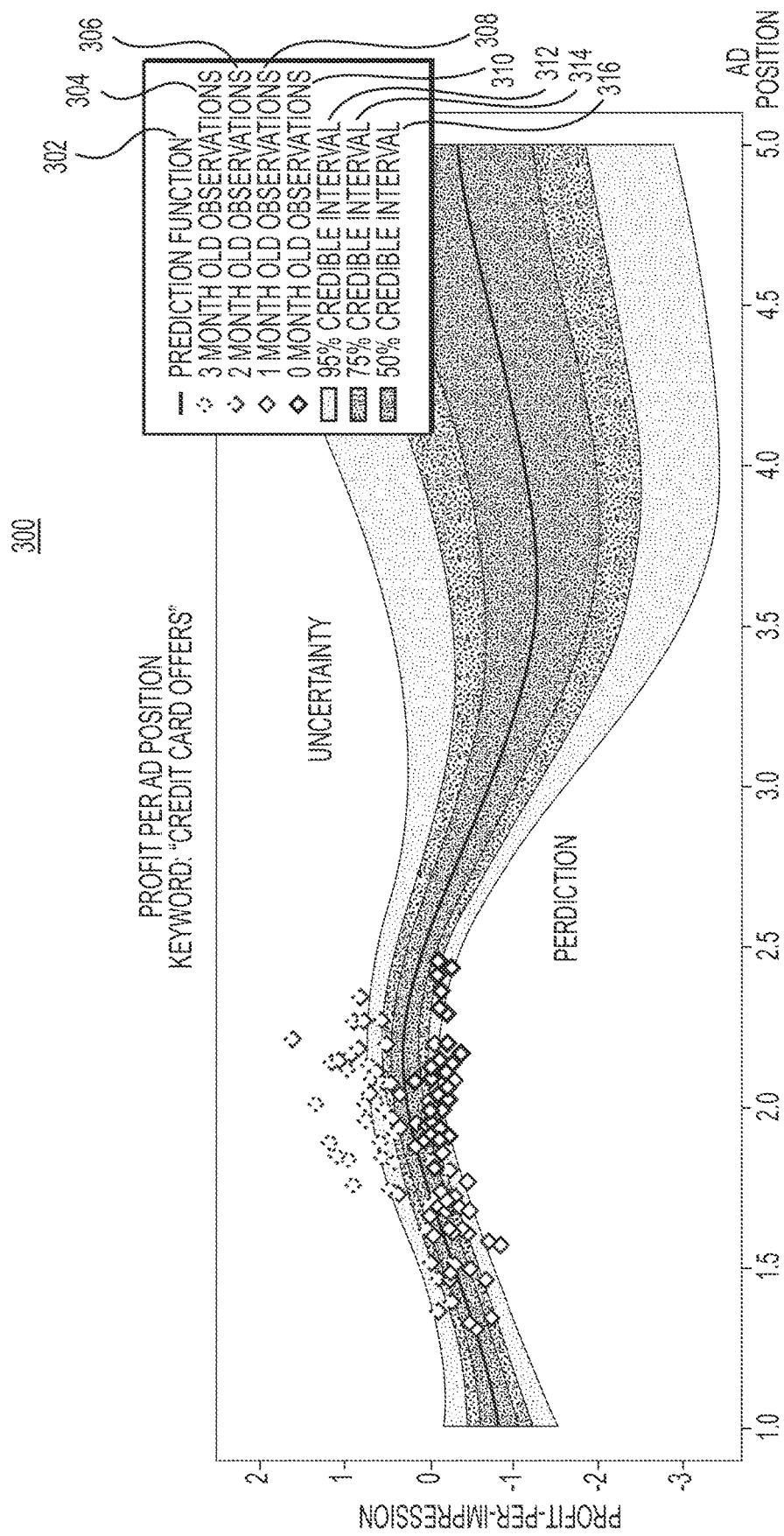
FIGS. 3A-3D depict charts for targeting bid and position for a keyword, according to one or more embodiments.
Figure 3B:
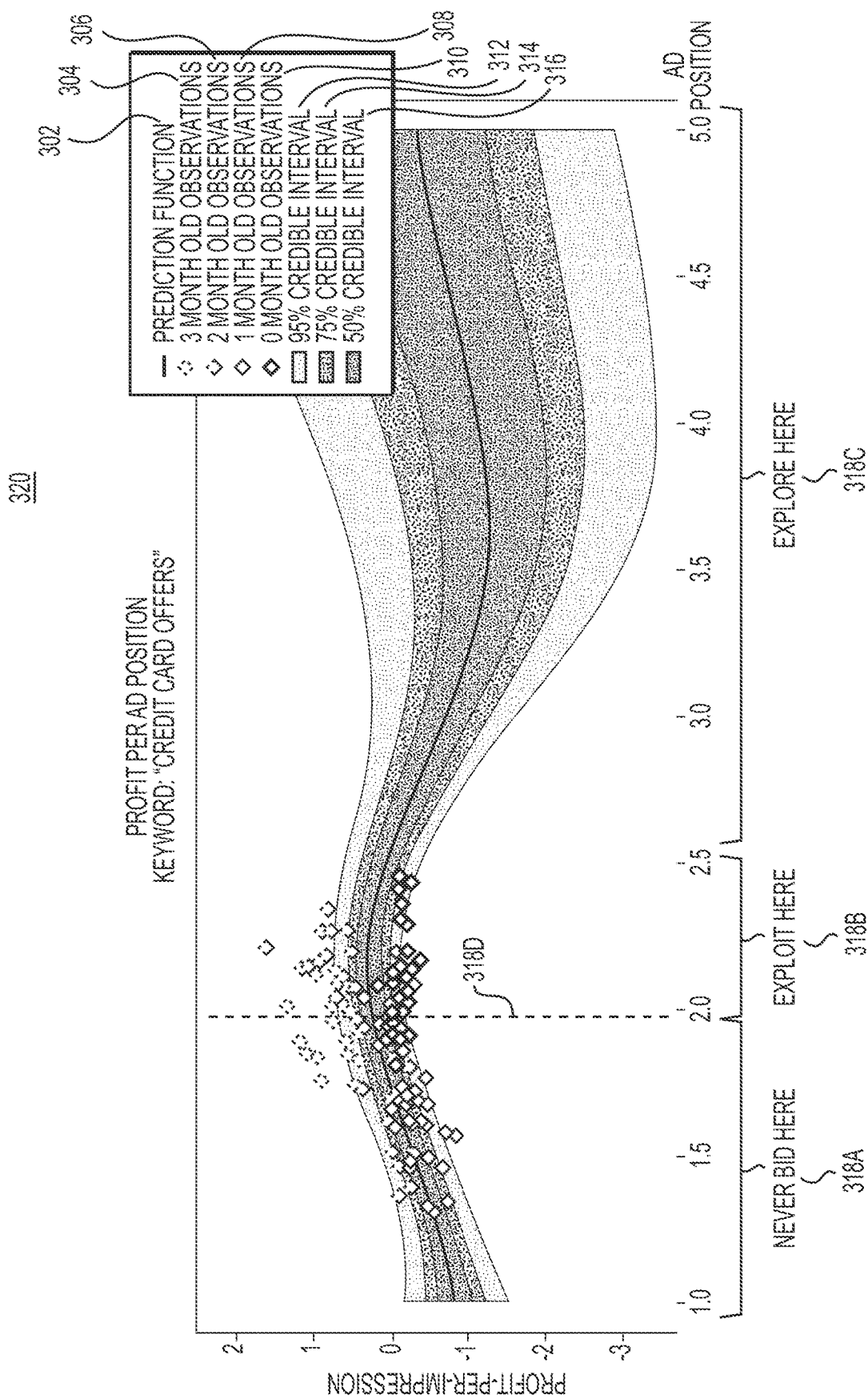
Figure 3D:
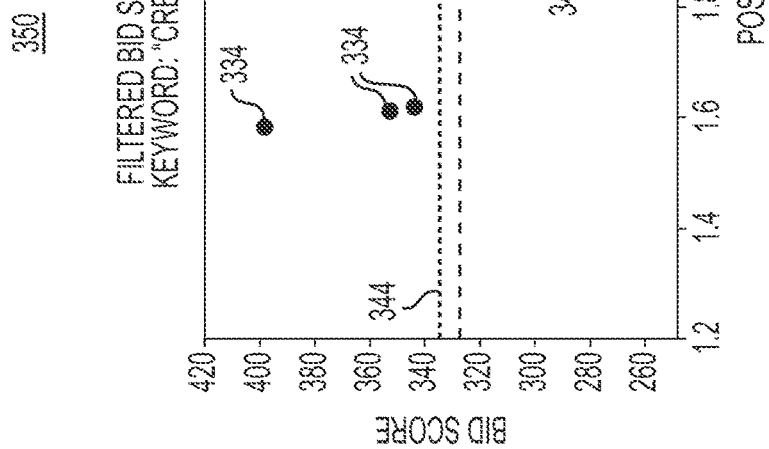
Figure 3C:
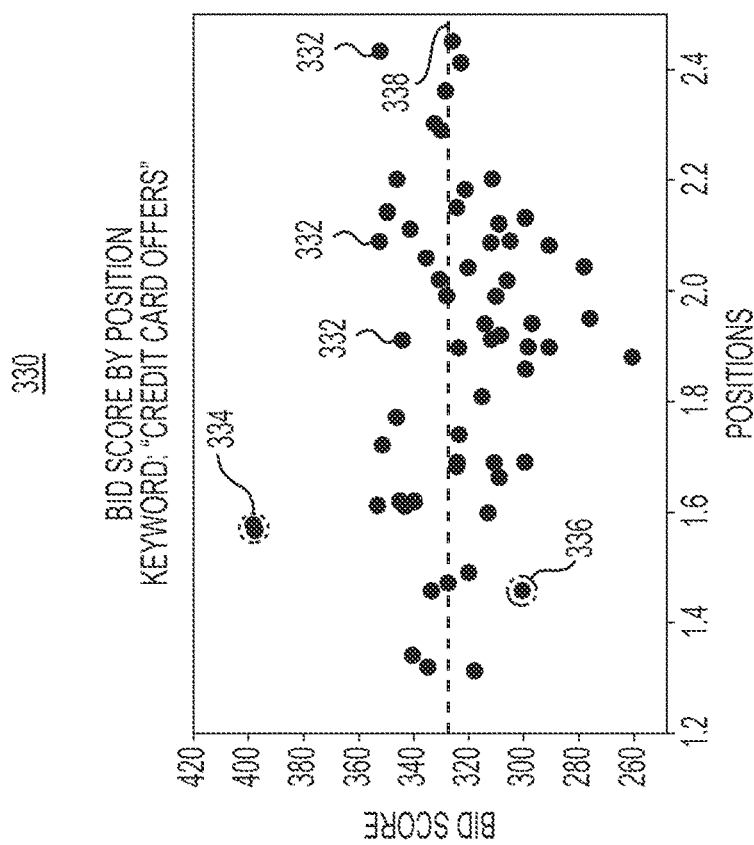

FIGS. 3A-3D depict charts for targeting bid and position for a keyword, according to one or more embodiments. FIG. 3A depicts a chart 300 explaining input(s) and output(s) of an exemplary Gaussian process model. FIG. 3B depicts a chart 320 explaining an exemplary selection algorithm. FIG. 3C depicts a chart 330 explaining historical bid position data and an exemplary backwards filtering model. FIG. 3D depicts a chart 350 explaining a bid selection process.

Specifically, in chart 300, the Gaussian process model may receive, as one or more inputs, a feature vector including observations. For instance, observations may include all observations from the previous four months, such as 3-month old observations 304, 2-month old observations 306, 1-month old observations 308, and 0-month old observations 310. Note, the feature vector may include older observations (e.g., from before four months prior to a present date) or the feature vector may include observations from other periods of time, such as only 1-month old observations 308 and 0-month old observations 310, or only 0-month old observations 310, etc. Each observation may include a position-value pair. The position-value pair may include a position and a value. The position-value pairs for the observations may be generated based on the historical keyword information 210B and the keyword information 205, as discussed above with respect to FIG. 2A. The positions may be ad positions (e.g., positions of sorted list 120) for a keyword, and the values may correspond to a profit-per-impression for the keyword. Therefore, as depicted in chart 300 of FIG. 3A, the observations may depict data points for profit-per-ad position for a keyword, such as "credit card offers."

Based on the feature vector, the Gaussian process model may obtain/output a prediction function 302 and associated uncertainties (displayed a 50% credible interval 316, a 75% credible interval 314, and a 95% credible interval 312). The prediction function 302 and the associated uncertainties may relate positions to expected values. Specifically, the Gaussian process model may obtain the prediction function 302 and the associated uncertainties, as discussed above with respect to FIG. 2A. It is understood that the 50% credible interval 316, the 75% credible interval 314, and the 95% credible interval 312 are merely exemplary. In additional or alternative arrangements, different credible intervals or more or less credible intervals, such only a 50% credible interval, a 50% credible interval and a 80% credible interval, etc., may be employed.

In chart 320, the selection algorithm may receive as inputs the outputs of the Gaussian process model (e.g., the prediction function 302 and the associated uncertainties). The selection algorithm may select a target position, as discussed above with respect to FIG. 2A. Specifically, in the case the selection algorithm is using a Thompson sampling reinforcement learning model, the Thompson sampling reinforcement learning model may select a target position from an exploit range 318B of positions or an explore range 318C of positions according to an exploit-explore ratio of the Thompson sampling reinforcement learning model. Furthermore, the Thompson sampling reinforcement learning model may avoid selecting (e.g., not select) the target position from a no-bid range 318A of positions.

The no-bid range of positions 318A, as separated from an example exploit range 318B and an example explore range 318C, may be determined based on positions corresponding to expected values below a threshold value. In the case depicted in FIG. 3B, the Thompson sampling reinforcement learning model may determine a first range of positions, as approaching from zero, that have a profit-per-impression below zero (as the threshold), as the no-bid range 318A of positions. A position at which expected values exceed the threshold, as approaching from zero, may be depicted as a vertical line 318D. Furthermore, the Thompson sampling reinforcement learning model may determine that positions greater than the position at which expected values exceed the threshold, may correspond to the example exploit range 318B and the example explore range 318C. The relative sizes (e.g., the magnitude of the range) of the exploit range 318B and the explore range 318C may be determined based on the expected values and the positions for the keyword. For instance, the exploit range 318B may be determined as any range that has expected values above the threshold, and the explore range 318C may be determined as any range (other than the no-bid range 318A) that has an expected value below the threshold. The selection of the target position may be determined by the exploit-explore ratio, where the exploit-explore ratio determines how often a position is selected from the exploit range 318B and how often a position is selected from the explore range 318C. For instance, the exploit-explore ratio may be four (4) exploit selections to one (1) explore selection in a cycle, or the exploit-explore ratio may select exploit or explore randomly with weighted odds towards exploit (e.g., more likely to select exploit over explore, but the selection remains random). The explore-exploit ratio and regions may be determined completely by the Thompson sampling reinforcement model. The random selection may be generated by, e.g., a random number generator.

In chart 330, the historical bid position data 332 may be plotted by bid score by position for a keyword. As depicted in FIG. 3C, the historical bid position data 332 may be for the keyword "credit card offers."

The backwards filtering model may filter the historical bid position data 332 to form a bid-to-position function, as discussed above with respect to FIG. 2A. Specifically, the backwards filtering model may start with the most recent value and progress backwards in time, attempting to form a monotonically decreasing function on the values of the historical bid position data 332. The backwards filtering model may use a break-even point 338 determined by the results of the filtering method and the bid-to-position model. The bid-to-position function may include discrete values 334 formed from remaining values of the historical bid position data 332 after the applying the backwards filtering model. Removed values 336 may be considered no longer valid for a current bid landscape.

In chart 350, the bid selection process may use the discrete values 334 formed from remaining values of the historical bid position data 332 to estimate a bid information 344 for the target position 342. Specifically, to estimate the bid information 344 for the target position 342, the bid selection process may interpolate to the target position 342 using preceding and following discrete values (e.g., values 334 next to point 340) and their corresponding positions to obtain the bid information 344.

In the case there is not a following or preceding discrete value, the bid selection process may use a predefined adjustment per position to obtain the bid information 344 based on the following or preceding discrete value that is present. For instance, the predefined adjustment per position may be a +/−15% bid adjustment to move up/down per position.

Figure 4:
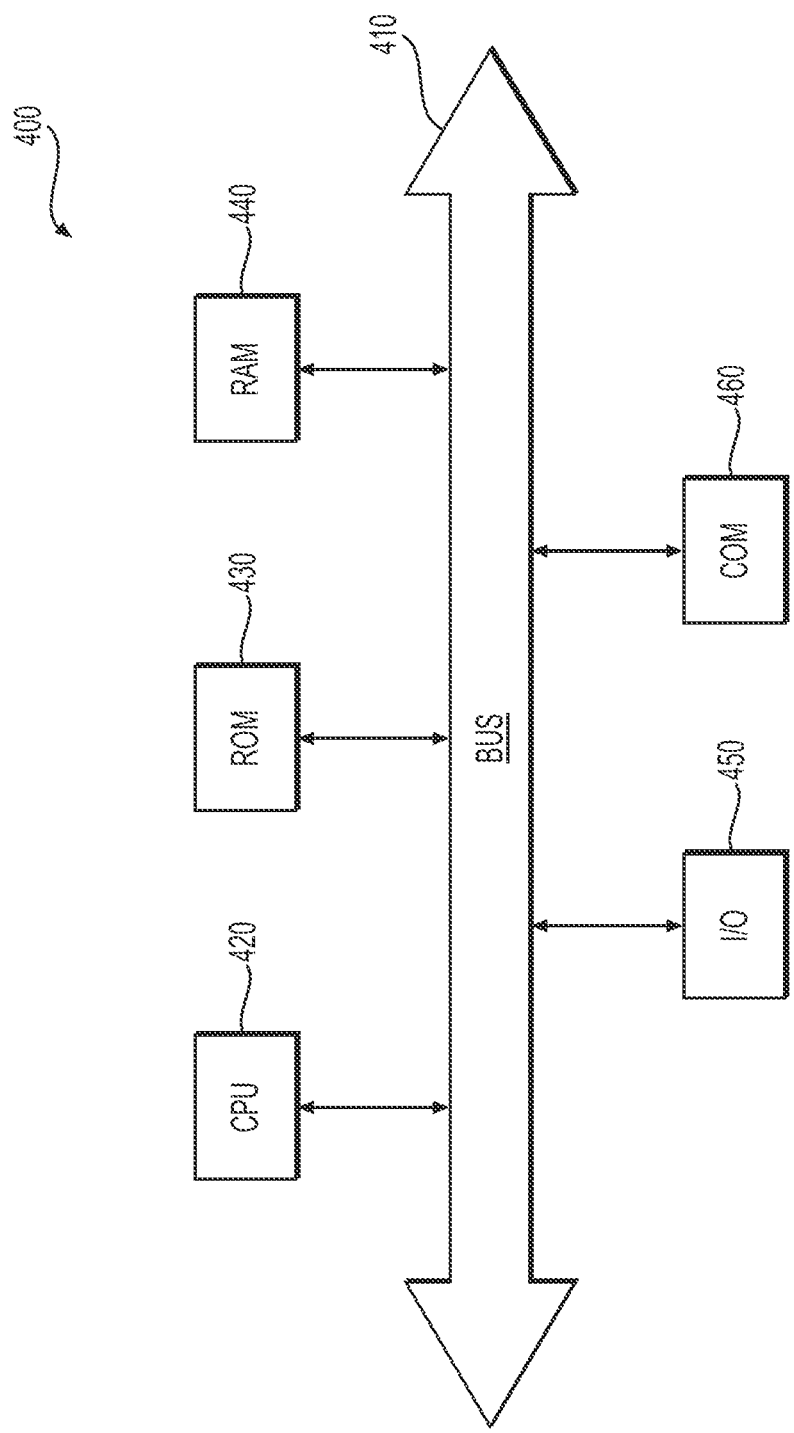
FIG. 4 depicts an example system that may execute techniques presented herein.

FIG. 4 depicts an example system that may execute techniques presented herein. FIG. 4 is a simplified functional block diagram of a computer, such as computing device 210, that may be configured to execute techniques described herein, according to exemplary embodiments of the present disclosure. Specifically, the computer (or "platform" as it may not a be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for targeting bid and position for a keyword, comprising:
    requesting keyword performance information from a first search engine in response to a trigger condition being met;
    receiving the keyword performance information;
    in response to receiving the keyword performance information, receiving historical keyword information associating an application, an account, a conversion, or a value with the keyword performance information based on a user device tracking and/or selection of webpages or links displayed at specific positions of lists for a keyword of the keyword performance information;
    modifying a database by joining the keyword performance information and the historical keyword information to generate a keyword dataset;
    generating a feature dataset in response to modifying the database, the feature dataset comprising a position-value pair for the keyword, the position-value pair being based on:
        a present value of the application, the account, the conversion, or the value;
        a present cost of the application, the account, the conversation, or the value; and
        a number of impressions of the keyword;
    determining a prediction function and associated uncertainties based on the position-value pair for the keyword;
    determining a target position for the keyword based on applying a selection operation to the prediction function and the associated uncertainties, wherein the selection operation outputs the target position based on a exploit-explore ratio;
    applying a backwards filtering model to a historical bid position data to form a bid-to-position function by starting with a most recent value-position-time pair of a plurality of value-position-time pairs and progressing backwards in time to form a monotonically decreasing function of values and positions of the value-position-time pairs selected according to a valid-or-not algorithm;
    determining bid information based on the target position and the bid-to-position function; and
    transmitting a bid message to a second search engine, the bid message including the bid information.

2. The computer-implemented method of claim 1, further comprising:
    receiving, after transmitting the bid message, a result of the bid message for the keyword; and
    updating the selection operation based on the result.

3. The computer-implemented method of claim 1, wherein the keyword performance information includes information about at least one of a number of clicks, a number of impressions, or an average position for the keyword.

4. The computer-implemented method of claim 3, wherein the keyword performance information is obtained at a predetermined interval, and a keyword value information is updated based on a most recently obtained keyword performance information.

5. The computer-implemented method of claim 4, wherein the keyword value information is updated based on a moving average associated with the application, the account, the conversion, or the value.

6. The computer-implemented method of claim 1, wherein the determining the prediction function and the associated uncertainties includes:
  obtaining a feature set including the position-value pair for the keyword; and
  processing the feature set and a prior function, using Bayesian inference, to make a posterior inference to determine the prediction function and the associated uncertainties.

7. The computer-implemented method of claim 6, wherein the prior function is initiated as one or more of linear functions, quadratic functions, or exponential functions relating to kernels.

8. The computer-implemented method of claim 6, wherein the prior function is initiated as one or more of functions relating to kernels, including constant, squared exponential, matern, periodic, or linear functions.

9. The computer-implemented method of claim 6, further comprising, after the determining the prediction function and the associated uncertainties a first time, storing the prediction function for the keyword as the prior function to be used in subsequent iterations of determining the prediction function and the associated uncertainties.

10. The computer-implemented method of claim 6, wherein the obtaining the feature set includes:
  filtering the position-value pair to include a specific period of time, based on a time associated with a value-position-time set of the position-value pair.

11. The computer-implemented method of claim 1, wherein the exploit-explore ratio is based on an exploit range of positions when an exploit action is chosen or an explore range of positions when an explore action is chosen according to the exploit-explore ratio.

12. The computer-implemented method of claim 11, wherein the exploit range of positions and the explore range of positions are determined based on expected values and the positions for the keyword.

13. The computer-implemented method of claim 12, wherein the selection operation avoids selecting the target position from a no-bid range of positions.

14. The computer-implemented method of claim 13, wherein the no-bid range of positions is determined based on positions corresponding to expected values below a threshold value.

15. A system for targeting bid and position for a keyword by tracking users interacting with webpages or links for keywords, the system comprising:
  a memory storing instructions; and
  a processor executing the instructions to perform a process including:
    requesting keyword performance information from a first search engine in response to a trigger condition being met;
    receiving the keyword performance information;
    in response to receiving the keyword performance information, receiving historical keyword information associated with the keyword performance information based on a user device tracking and/or selection of webpages or links displayed at specific positions of lists for a keyword of the keyword information;
    modifying a database by joining the keyword performance information and the historical keyword information to generate a keyword dataset;
    generating a feature dataset in response to modifying the database, the feature dataset comprising a position-value time set for the keyword, the position-value time set being based on a click volume, an impression volume, or a profit volume;
    determining a prediction function and associated uncertainties based on the position-value time set for the keyword;
    determining a target position for the keyword based on applying a selection operation to the prediction function and the associated uncertainties, wherein the selection operation outputs the target position based on a exploit-explore ratio;
    applying a backwards filtering model to a historical bid position data to form a bid-to-position function by starting with a most recent value-position-time of a plurality of value-position-times and progressing backwards in time to form a monotonically decreasing function of values and positions of the value-position-time set selected according to a valid-or-not algorithm;
    determining bid information based on the target position and the bid-to-position function; and
    transmitting a bid message to a second search engine, the bid message including the bid information.

16. The system of claim 15, wherein the process further includes:
  receiving, after transmitting the bid message, a result of the bid message for the keyword; and
  updating the selection operation based on the result.

17. The system of claim 15, wherein the determining the prediction function and the associated uncertainties includes:
  obtaining a feature set including the position-value time set for the keyword; and
  processing the feature set and one or more prior function(s) using Bayesian inference to make a posterior inference to determine the prediction function and the associated uncertainties.

18. The system of claim 15, wherein the bid-to-position function includes discrete values formed from remaining values of the historical bid position data after the applying the backwards filtering model, and
  the determining the bid information using the target position and the bid-to-position function includes curve fitting to estimate the bid information for the target position.

19. The system of claim 18, wherein the estimating the bid information for the target position includes interpolating the target position using preceding and following discrete values.

20. A non-transitory computer-readable medium storing instructions that, when executed by a processor, cause the processor to perform a method for targeting bid and position for a keyword by tracking users interacting with webpages or links for keywords, the method comprising:
  obtaining observations of value with respect to position for the keyword, the observations being based at least on keyword value information, the keyword value information being associated with the keyword based on monitoring user interactions;
  receiving a Gaussian Process Model configured to obtain a prediction function and associated uncertainties;
  applying the Gaussian Process Model on the observations to obtain the prediction function and associated uncertainties, the prediction function and the associated uncertainties relating positions to expected values;
  receiving a Thompson sampling reinforcement learning model configured to obtain a target position;

applying the Thompson sampling reinforcement learning model on the expected values and the positions to obtain a target position the applying the Thompson sampling reinforcement learning model including an agent taking one of one or more action(s) from an action function according to a policy, the one or more action(s) including an exploit action or an explore action, the exploit action or the explore action being chosen according to an exploit-explore ratio of the policy;

obtaining historical bid position data including a value-position-time set for the keyword;

applying a backwards filtering model to the historical bid position data to form a bid-to-position function;

determining bid information using the target position and the bid-to-position function; and transmitting a bid message to a search engine, the bid message including the bid information.

* * * * *